United States Patent
Waters

[11] Patent Number: 6,076,546
[45] Date of Patent: Jun. 20, 2000

[54] OVERFLOW PROTECTION VALVE ASSEMBLY

[76] Inventor: Michael Waters, c/o 782 Church Rd., Elgin, Ill. 60123

[21] Appl. No.: 09/039,663

[22] Filed: Mar. 16, 1998

[51] Int. Cl.[7] .............................. F16K 31/20; F16K 33/00
[52] U.S. Cl. ......................... 137/390; 137/442; 137/446; 141/198; 222/67
[58] Field of Search .................................... 137/434, 442, 137/446, 389, 390, 410, 443, 444; 141/198; 222/64, 67

[56] References Cited

U.S. PATENT DOCUMENTS

| | | | |
|---|---|---|---|
| D. 266,019 | 8/1982 | Crossman | D23/19 |
| 643,906 | 2/1900 | Marsh | 137/446 |
| 1,839,042 | 12/1931 | McPartland | 137/446 |
| 2,270,910 | 1/1942 | Svirsky | 137/446 |
| 2,731,030 | 1/1956 | Phillips et al. | 137/413 |
| 2,756,769 | 7/1956 | Martin et al. | 137/446 |
| 3,189,039 | 6/1965 | Bauer | 137/434 |
| 4,064,907 | 12/1977 | Billington et al. | 137/446 |
| 4,142,552 | 3/1979 | Brown et al. | 137/446 |
| 4,313,459 | 2/1982 | Mylander | 137/416 |
| 4,423,750 | 1/1984 | Morizumi et al. | 137/413 |
| 4,444,230 | 4/1984 | Van Mullem | 137/415 |
| 4,462,417 | 7/1984 | Trinkwalder, Jr. | 137/39 |
| 4,469,117 | 9/1984 | Hansen | 137/39 |
| 4,483,367 | 11/1984 | Ross, Jr. et al. | 137/416 |
| 4,510,964 | 4/1985 | Wendling | 137/210 |
| 4,541,464 | 9/1985 | Christiansen | 137/446 |
| 4,648,431 | 3/1987 | Strongert et al. | 141/18 |
| 4,796,650 | 1/1989 | Hwang | 137/443 |
| 5,048,565 | 9/1991 | Oi | 137/614.19 |
| 5,234,019 | 8/1993 | Forner | 137/410 |
| 5,282,496 | 2/1994 | Kerger | 137/446 |
| 5,460,197 | 10/1995 | Kerger et al. | 137/413 |
| 5,472,012 | 12/1995 | Wood et al. | 137/416 |
| 5,485,866 | 1/1996 | Bowen | 137/554 |
| 5,487,404 | 1/1996 | Kerger | 137/413 |
| 5,522,415 | 6/1996 | Hopenfeld | 137/15 |
| 5,660,214 | 8/1997 | Pettesch | 141/198 |
| 5,787,942 | 8/1998 | Preston et al. | 141/198 |
| 5,829,465 | 11/1998 | Garreston | 137/413 |
| 5,850,849 | 12/1999 | Wood | 137/413 |

FOREIGN PATENT DOCUMENTS

| | | | |
|---|---|---|---|
| 605477 | 6/1960 | Italy | 137/446 |

*Primary Examiner*—George L. Walton
*Attorney, Agent, or Firm*—Fitch, Even, Tabin & Flannery

[57] ABSTRACT

A valve assembly is provided that prevents overfilling of vessels, such as tanks used to hold liquified gas, beyond a predetermined maximum level. Preferably, the valve assembly is for use with an LP tank attached at the bottom of a service valve thereof. The valve assembly has a valve member controlled for shifting by a float assembly that rises and falls with the fluid level in the tank. The float assembly keeps the valve member removed from the flow of fluid through the valve housing during tank filling operations in a chamber of a diverter member until the maximum fill level is approached when the float assembly allows the valve member to begin to shift into a blocking position projecting from the diverter member restricting flow into the tank and eventually cutting it off when the maximum fill level is attained. Flow paths defined by recessed channels formed on the exterior of the diverter member direct incoming fluid flow around the valve member in the diverter member chamber during tank filling operations. A port of the housing is below the flow paths which direct fluid through the port during tank filling operations until the valve member shifts to its blocking position. The valve assembly also allows for outgoing flow therethrough for unloading of the tank when opened to ambient by shifting of the valve member off from its seat in the blocking position due to the pressure differential in the tank interior versus the lower ambient pressures exterior of the tank. As the tank is unloaded, the float assembly lowers pivoting cam member thereof to lift valve stem causing the valve member to shift from between the flow paths and port allowing fluid to flow out from the tank.

13 Claims, 5 Drawing Sheets

FIG. 14

OVERFLOW PROTECTION VALVE ASSEMBLY

FIELD OF THE INVENTION

The invention relates to a valve assembly and, more particularly, to a valve assembly for a tank that prevents filling of the tank beyond a predetermined maximum fill level.

BACKGROUND OF THE INVENTION

There have been a number of different valve assemblies designed to prevent the fluid level in tanks from exceeding a predetermined level of fluid therein. In particular, with a tank used to contain compressed or liquified gas, such as propane, it is important that the liquified gas loaded into the tank under pressure not exceed a certain fluid level in the tank so that a sufficient amount of head space at the top of the tank is maintained for safety purposes. Because of the high coefficient of thermal expansion of liquified propane gas, increases in ambient temperatures can cause the head space in the tank to be rapidly consumed. The tanks are rated so as to withstand a predetermined amount of internal pressure; however, if the tank is overfilled beyond the maximum level, there is the danger that the internal pressure may exceed the rated strength of the tank, particularly if exposed to excessive temperatures, and lead to potentially dangerous failures of the tank walls.

In this regard, it is known to provide the tanks with a dip tube that extends through the tank wall into the tank interior space to a specified level below the maximum fill level with its other end open to ambient so that once the fluid level reaches the bottom end of the tube, the liquified gas begins to be evacuated from the tank. As is apparent, if the operator who is filling the tank does not detect this condition and continues to fill the tank, a potentially hazardous situation around the tank filling station is created.

As mentioned, there have been a number of prior art devices that prevent further filling of the tank once the maximum fill level is attained. One of the problems with some of these prior valve devices is that they are not readily adapted for use with current service valves that are already in place on the tanks. In this regard, many of these valves do not allow for outgoing flow therethrough or, if they do so, only allow such reverse flow in relatively small amounts. Another shortcoming with a majority of these devices lies in their complexity, as many require a large number of different parts. For example, in a number of prior art patents, the valves utilize a primary valve member and a secondary valve member controlled by a float assembly. The primary valve blocks incoming fluid flow when the float assembly is operable at maximum fill conditions to seat the secondary valve. When the secondary valve seals its associated port, there is a fluid pressure buildup between the secondary and primary valves that pushes the primary valve onto its seat sealing lateral ports to stop fluid flow into the tank. The use of two moving valve members, and the large number of associated parts in such a valve assembly, is undesirable in terms of driving up the cost for the valve, increased time and complexity for assembly thereof, the greater likelihood of its failure under repeated cycling over time, and the ability to provide for adequate outgoing flow therethrough.

Accordingly, there is a need for a simpler and less expensive valve assembly that prevents overfilling of tanks beyond a predetermined fluid level therein. More particularly, it would be desirable to provide an overflow protection valve assembly that can be attached to a service valve such as on an LP tank for allowing flow into and out from the tank through the valve assembly.

SUMMARY OF THE INVENTION

In accordance with the present invention, a valve assembly is provided which stops fluid flow into a vessel at a predetermined fluid level therein, while allowing good fluid flow therethrough for filling the vessel and for discharging fluid therefrom. The preferred form of the valve assembly is for use with an LP tank for containing liquified propane gas. Thus, when the term fluid or fluid flow is utilized herein, it will be understood to encompass both the flow of compressed or pressurized gas (e.g., propane) in a fluid state, and the flow of propane in its gaseous state and combinations thereof where the liquified gas is undergoing two-phase flow depending on the relative pressures in the tank versus the pressurized filling source and/or the ambient.

The valve assembly of the present invention includes a valve member which shifts in a valve housing as controlled by the rising and falling of a float assembly as the fluid level in the vessel rises and falls. The valve member shifts into a blocking position relative to a port of the housing that communicates with the vessel interior at a predetermined maximum fill level in the vessel interior space. A fluid flow path is provided through the housing with the valve member blocking position being between the flow path and the port of the housing. When the fluid level in the vessel is below the maximum fill level, the float assembly shifts the valve member from the blocking position and keeps it removed from the flow of fluid between the flow path and the port. In this manner, the valve member is not exposed to fluid flow in the housing during filling operations of the vessel. Because the valve member is removed from the fluid flow, a substantially unrestricted flow path is provided through the valve assembly herein so as to provide a sufficiently high rate of flow into the vessel for rapid filling of the vessel such as to the maximum fill level, if desired.

In one form, the valve housing includes a seat at the port and the valve member shifts onto the seat in the blocking position at the predetermined maximum fill level with the incoming fluid flow during filling operations assisting in tightly pushing the valve member onto the seat to prevent flow through the port and into the vessel interior. Thus, while the present valve assembly keeps the valve member removed from the fluid flow during filling operations at fluid levels below the maximum fill level, the valve assembly is designed to makes use of the flow in obtaining a tight seal to prevent further flow into the vessel interior once the maximum fill level is attained.

The valve housing may include an inner member in which the valve member shifts and an outer member rigidly attached to the inner member with the flow path defined between the housing inner and outer members. The flow path can include a plurality of discrete flow paths around the housing inner member for redirecting incoming fluid around the valve member in the inner member. Each of the flow paths communicate with the port of the housing for directing incoming fluid therethrough during vessel filling operations and for receiving outgoing fluid through the port from the vessel interior during vessel unloading operations.

In another form, the flow path has a predetermined size for permitting a predetermined flow rate of fluid therethrough during filling operations to limit fluid turbulence that would keep the valve member from shifting to the blocking position at the predetermined fill level. Keeping the valve member removed from the flow of fluid through the valve assembly during filling operations allows for a good flow rate of fluid into the vessel, as previously discussed. It is also necessary to select the cross-sectional size of the flow path so that an excessive amount of turbulent flow does not develop that might prevent the valve member from shifting to the blocking position between the flow path and port at the predetermined fill level.

In a preferred form, the float assembly includes a pivotable arm and attached float of predetermined length for fitting in the vessel with the float being attached to one end of the arm which pivots the arm as the float rises and falls with the fluid level, and a cam attached to the other end of the arm for being pivoted thereby. The valve member includes a stem extending beyond the valve housing into engagement with the cam for keeping the valve member removed from the flow of fluid until the fluid in the vessel interior reaches the predetermined fill level. A biasing member is provided which urges the valve member toward the blocking position with a predetermined force for overcoming turbulence created during filling operations. The predetermined force is selected to be sufficiently low to allow the arm to pivot the cam at fluid levels in the vessel interior below the predetermined fill level so that the valve member is not in its blocking position.

Where the valve assembly is for the service valve on an LP tank designed for home use, the tank is, by necessity, somewhat limited in size so that it can be readily manipulated and moved around by the home user such as for hooking up to a gas cooking grill. While the use of a biasing member is effective to overcome turbulence that might develop during filling operations with the present valve assembly, the biasing force generated thereby must also allow the float assembly to shift the valve member out from the flow of fluid against the biasing force. With the relatively small diameter of LP tanks, the lever arm of the float assembly will be limited thereby and thus is also relatively small.

With the present valve assembly, the biasing force is coordinated with the length of the arm and float of the float assembly so that the valve member can shift to the blocking position at the predetermined fill level and can shift therefrom by operation of the float assembly at fluid levels below the predetermined fill level. The flow rate of the fluid through the flow path can be chosen so as to keep fluid turbulence to a minimum, as previously discussed, so that the bias force that must be applied to the valve member to overcome the turbulence is also minimized which, in turn, readily allows the small lever arm provided by the float assembly as afforded by the small diameter, e.g., 12 inches, of the LP tank to shift the valve member from the blocking position to allow loading and unloading of the tank.

In one form, the float assembly includes a cam which pivots as the float assembly rises and falls with the vessel fluid level, and the valve member includes a stem attached thereto and extending into engagement with the cam during filling and unloading operations so that the cam is operable to shift the valve member in response to both rising and falling fluid levels in the vessel. In this manner, it is the float assembly including the cam thereof for shifting it to and from its blocking position which controls shifting of the valve member with the changing fluid levels in the vessel.

In another form of the invention, a valve assembly is provided for being connected to a service valve attached to a tank for holding liquified gas fluid in its interior at pressures greater than ambient exterior of the tank, with the liquified gas being loaded into and unloaded out from the tank interior with the service valve opened and through the valve assembly. The valve assembly includes a body affixed to the service valve and having an interior space to provide a fluid passageway therethrough between the service valve and the tank interior for loading and unloading of liquified fluid into and out from the tank. The valve member shifts in a portion of the body interior space in response to changing fluid levels in the tank interior. Flow paths are formed in the body for redirecting fluid flow through the body interior space during fluid loading operations around the portion of the space containing the valve member. A float assembly rises and falls with the fluid level in the tank interior for shifting the valve member in the body interior space portion. A port of the body is provided adjacent the flow paths with fluid flowing through the flow paths and into the port during vessel loading operations and flowing through the port and into the flow paths during vessel unloading operations. The float assembly is operable to allow the valve member to shift in a first direction to a blocking position between the flow paths and port during tank loading operations when the fluid level therein reaches the predetermined maximum fill level to stop further loading of fluid into the tank interior. The pressure differential between the tank and ambient is sufficient to cause the valve member to shift in a second direction opposite to the first direction away from the blocking position when the service valve is opened to the ambient with the tank at the predetermined maximum fill level for allowing fluid from the tank interior to flow through the fluid passageway and into and out from the service valve.

In a preferred form, the body can include an outer cylindrical portion and an inner diverter member rigidly secured in the cylindrical portion with the diverter member defining the portion of the body interior space in which the valve member is disposed. The diverter member includes opposite ends with one end being closed and the other end being open and facing the port. The flow paths are formed between the diverter member and the cylindrical portion with the valve member in its blocking position being generally at the diverter member open end so at least a portion of the valve member projects therefrom into the blocking position between the flow paths and port.

Preferably, the valve assembly body is affixed to the service valve to extend generally vertically in the interior of the tank. The fluid passageway of the body has an upper section and a lower section below the upper section and having the port at the bottom thereof with the portion of the body interior space containing the valve member being between the fluid passageway sections so that when the tank fluid level reaches the predetermined maximum fill level during tank loading, the valve member falls in the body interior space portion toward the port and into the flow of fluid which assists in shifting the valve member to its blocking position for sealing the port and preventing further fluid loading into the tank interior.

In one form, the float assembly includes a cam that is pivoted as the tank fluid level changes. A valve stem is connected to the valve member at one end thereof and engaged with cam at the other end thereof. The float assembly, including the cam thereof, is operable to support the valve stem at fluid levels below a predetermined maximum fill level during both fluid loading and unloading operations to keep the valve member in the portion of the body interior space removed from the flow path.

DETAILED DESCRIPTION OF THE PREFERRED EMBODIMENT

Figures 1, 2:
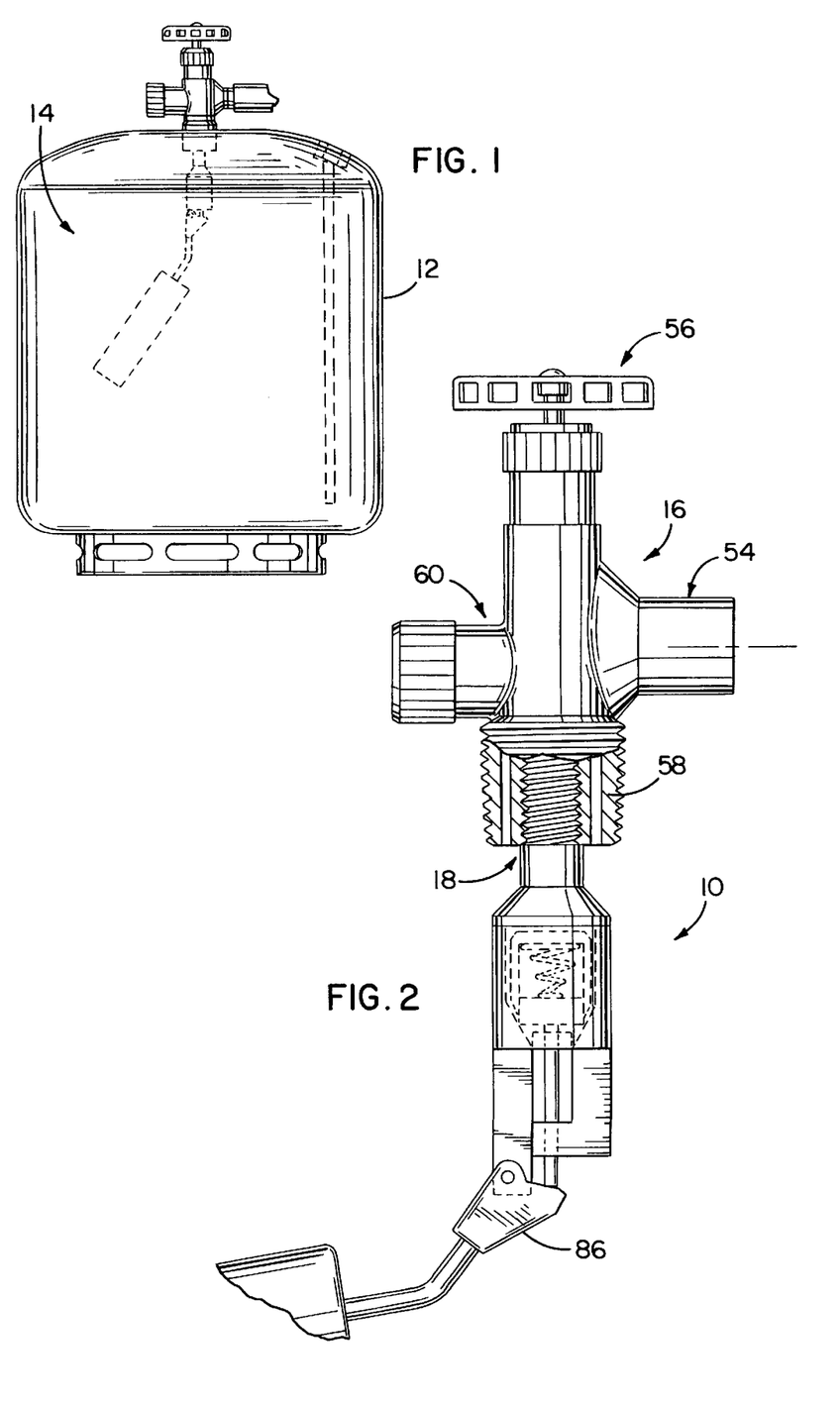
FIG. 1 is an elevational view of an overflow protection valve assembly in accordance with the present invention shown attached to a service valve of an LP tank in the interior thereof.
FIG. 2 is an enlarged elevational view of the valve assembly threaded to the service valve showing a cam of a float assembly supporting a stem of a valve member in a valve housing of the assembly.
Figures 3, 5, 6, 7, 8, 9:
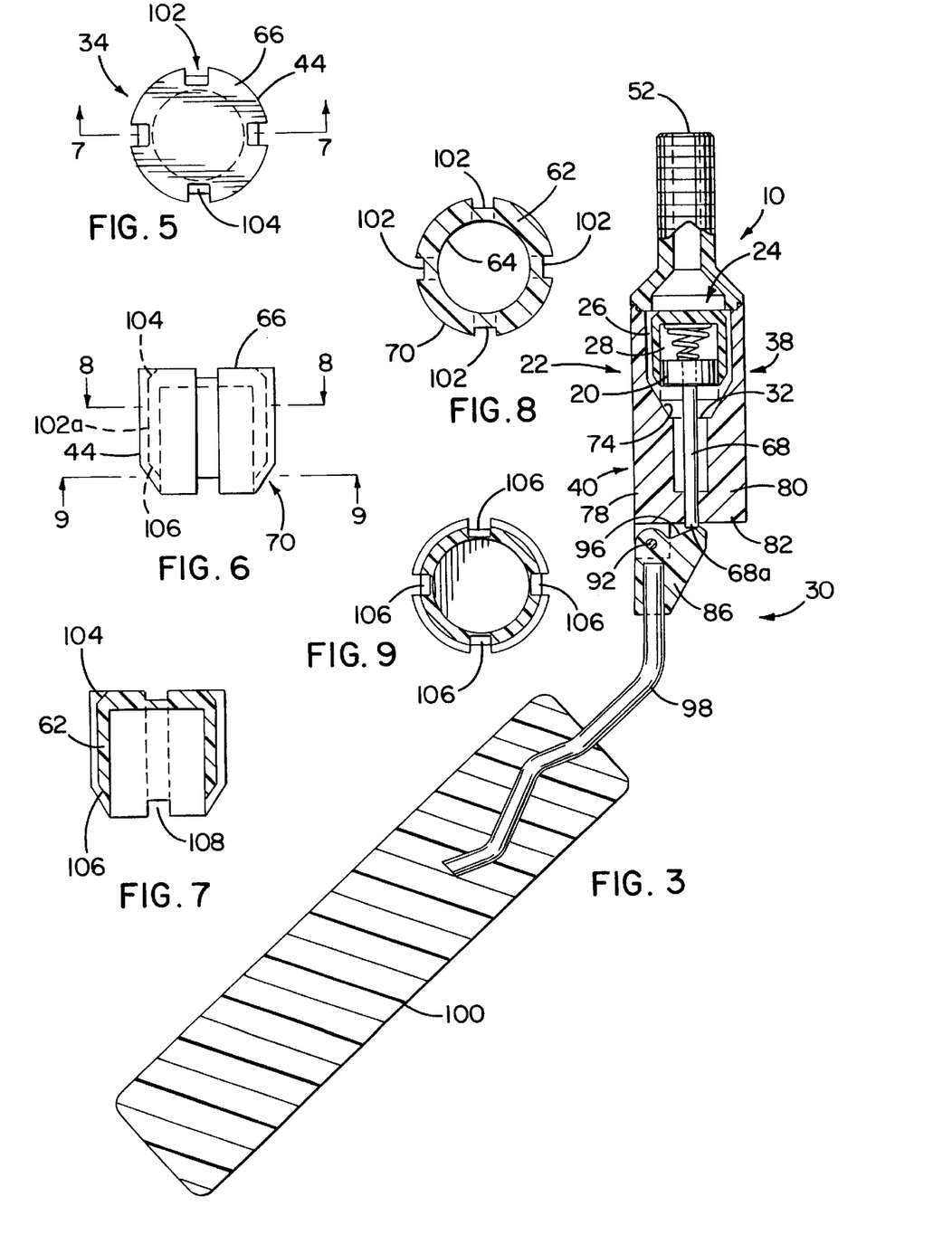
FIG. 3 is a sectional view of the valve assembly showing an interior space of the housing for providing a fluid passageway therethrough and including an inner diverter member rigidly attached therein in which the valve member is shifted by the cam pivotally mounted to the bottom of the housing.
FIG. 5 is a plan view of the diverter member showing the top closed end thereof and a plurality of recesses formed around the periphery providing flow paths for diverting incoming flow around the diverter member.
FIG. 6 is an elevational view of the diverter member showing a flow opening formed at the bottom of the flow paths.
FIG. 7 is a cross-sectional view of the diverter member taken along line 7—7 of FIG. 5.
FIG. 8 is a cross-sectional view of the diverter member taken along line 8—8 of FIG. 6.
FIG. 9 is a cross-sectional view of the diverter member taken along line 9—9 of FIG. 6.

In FIGS. 1–3, a valve assembly 10 is shown for use in preventing overfilling of vessels, such as a tank 12 for containing compressed or liquified gas under pressure in the interior 14 thereof. The valve assembly 10 is designed to permit fluid intake into the tank interior 14 in a filling or loading operation and discharge therefrom in an unloading operation. In this regard, the valve assembly 10 can be affixed to the service valve 16 provided for these functions as by a threaded connection 18 provided therebetween in the tank interior 14. The valve assembly 10 cuts off or blocks fluid intake into the tank 12 at a predetermined fluid level in the tank interior space 14 during tank filling operations. Where the tank 12 is an LP tank for containing liquified propane gas under pressure, the maximum fill level preferably is when the interior 14 is filled to eighty percent (80%) of its capacity so that at least twenty percent (20%) remains as head space to provide a safety factor which may be necessary such as if the tank 12 is exposed to higher than normal external ambient temperatures.

The valve assembly 10 herein is a relatively simple, inexpensive device with a few number of moving parts so as to increase the reliability of its operation over repeated cycling. Reliability of the operation of the valve assembly 10 is of particular importance given its safety purpose, and the fact that it will be operative each time the tank 12 is loaded and each time it is unloaded. The preferred valve assembly 10 herein only has a single moving valve member 20 that can be shifted to cut off flow at the maximum fill level of the tank 12. The valve assembly 10 includes a fixed housing or body 22 thereof which defines an interior space 24 extending therethrough for providing a fluid passageway between the service valve 16 and the tank interior 14. One important advantage of the present valve assembly 10 is that the valve member 20 is normally removed from the flow of fluid through the fluid passageway formed in the interior space 24 during tank filling operations so as to provide a generally unimpeded passageway through the valve assembly 10. In other words, the flow of fluid from the service valve 16 into the tank interior 14 during filling operations will not encounter a shiftable valve member, such as valve number 20, during its flow through the valve housing 22.

For this purpose, the valve assembly 10 is provided with at least one flow path 26, and preferably a plurality of such flow paths 26 in the valve assembly housing 22 which redirect fluid flow around a portion 28 of the valve assembly interior space 24 during filling operations in which the valve member 20 is shifted. The shifting of the valve member 20 in the interior space portion 28 is controlled by a float assembly 30 that rises and falls with the fluid level in the tank interior 14. Until the fluid level in the tank 12 reaches the maximum fill level, the valve member 20 is maintained in the portion 28 of the housing interior space 24 by the float assembly 30 with flow redirected therearound via the flow paths 26. In this manner, the valve member 20 does not serve as an impediment to flow into the tank interior 14 out from port 32 of the housing 22 situated adjacent to and downstream from the flow paths 26 during tank filling operations. At the maximum fill level, the valve member 20 at that time is shifted to cut off or block flow out from the port 32. In this blocking position, at least a portion of the valve member 20 projects from the interior space portion 28 into the blocking position which is between the flow paths 26 and the adjacent port 32.

Figures 4, 10:
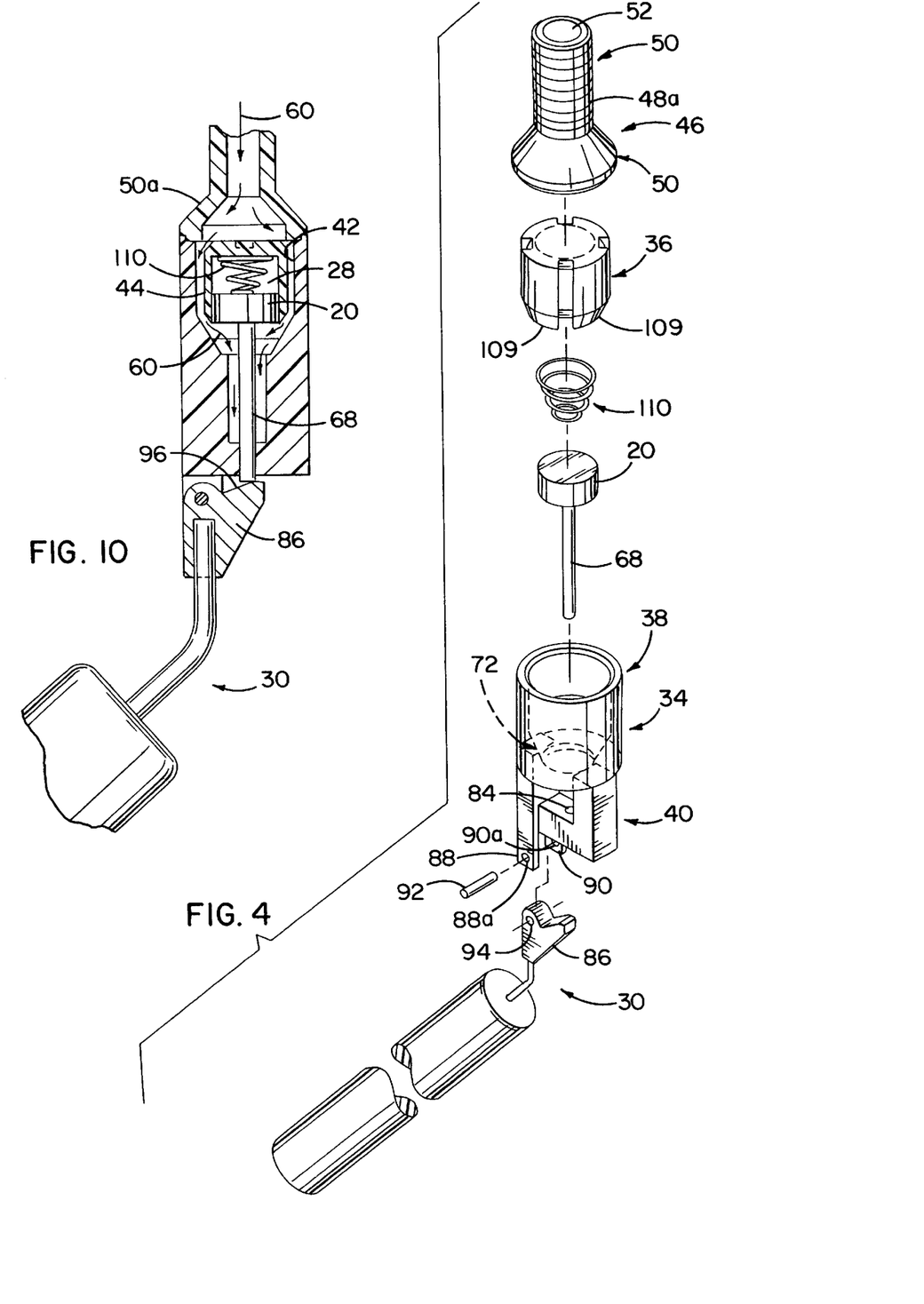
FIG. 4 is an exploded perspective view of the valve assembly of FIG. 3.
FIG. 10 is a sectional view of the valve assembly housing and cam showing a tank loading operation with fluid flowing through the valve passageway and the peripheral flow paths thereof and out from a bottom port of the housing into the tank interior with the float assembly cam supporting the stem to keep the valve member in the diverter member.

The preferred and illustrated valve housing 22 has an outer housing member 34 and an inner diverter member 36, as best seen in FIG. 4. In the preferred form, the outer housing member 34 has a cylindrical portion 38 and a guide portion 40 attached therebelow. The cylindrical portion 38 has an interior surface 42 having a substantially matching configuration to that of exterior surface 44 of the diverter member 36. To rigidly attach the diverter member 36 to the outer housing member 34, the housing member 34 has the diverter member 36 press fit thereon in tight fitting relation thereto due to the matching configurations of the respective surfaces 42 and 44. The valve housing 22 can also include a mounting member 46 having an upper cylindrical portion 48 having external threads 48a formed thereon and a lower flared-out conical portion 50 that is to be attached over the top of the outer housing member 34 and diverter member 36. Preferably, the outer housing member 44, diverter member 36, and mounting member 46 are all of a plastic material such as nylon 6/6 so that the mounting member 46 can be welded to the tops of the housing member 34 and diverter member 36 such as by spin welding or ultrasonic welding to keep the housing member 34 and diverter member 36 rigidly attached together with the mounting member 46 fixed over the top of the attached members 34 and 36.

The housing member 34, diverter member 36, and mounting member 46 assembled and rigidly attached together cooperate to form the valve assembly housing or body 22 having interior space 24 thereof which provides a fluid passageway for incoming fluid from service valve 16 and for outgoing fluid from tank interior 14. In this regard, the mounting member 46 is hollow and has an upper opening 52 for communicating with the interior of the service valve 16 for providing fluid flow between valve assembly interior 24 and the interior of the service valve 16. The service valve 16 can be of standard construction and includes a coupling socket 54 for being connected to a line for either loading liquified gas into the tank interior 14 from a pressurized liquified gas source or for unloading liquified gas from the tank interior 14 for use such as in a gas cooking grill. A handle knob 56 must be turned to open the passageway between the coupling 54 and the lower portion 58 of the service valve 16 that extends into the tank interior 14 into which the mounting member 46, and specifically the threaded cylindrical portion 48 thereof is threaded. The service valve 16 also includes a safety valve portion 60 which allows for the escape of gas in the event of overpressure conditions in the tank interior 14.

Figures 11, 12:
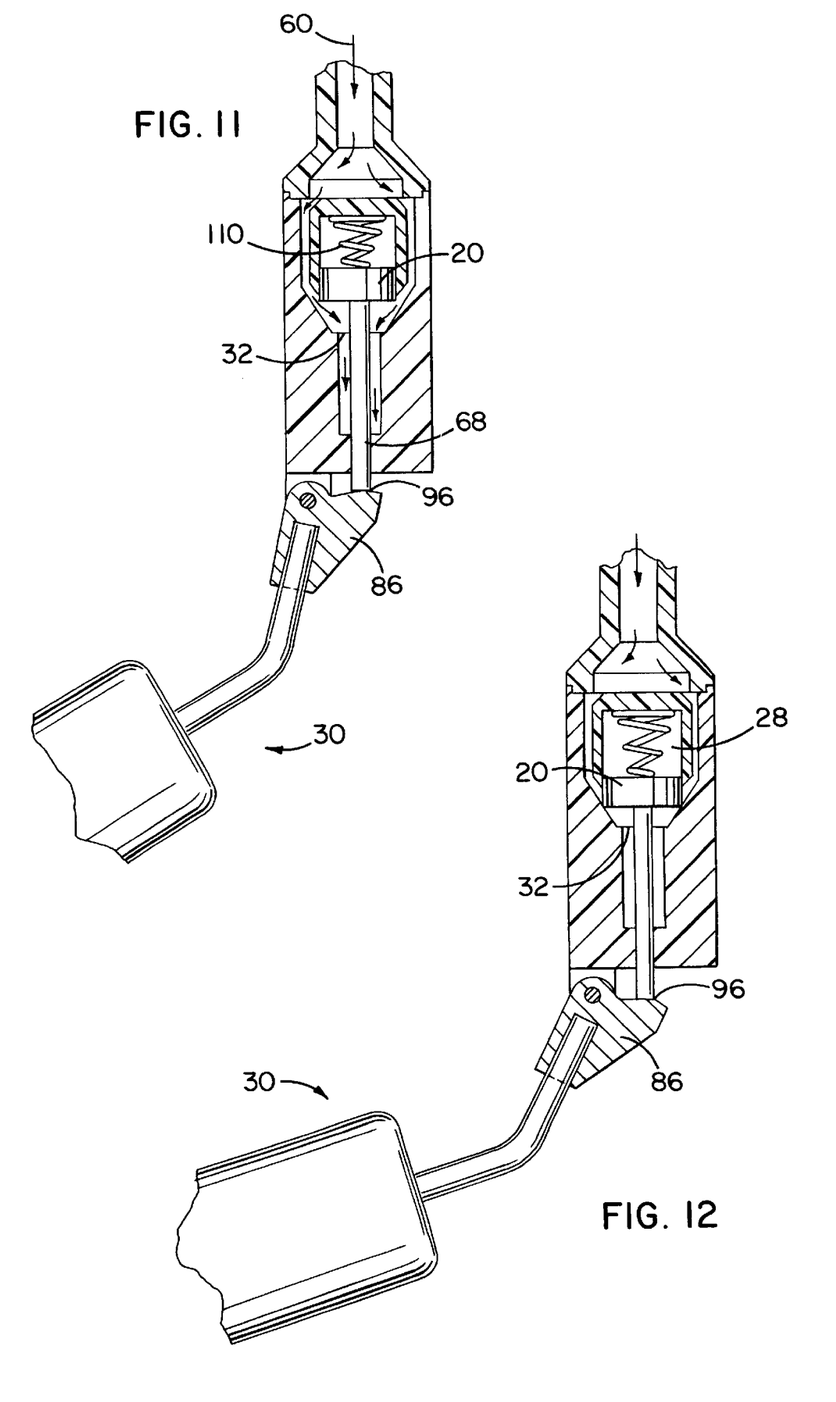
FIG. 11 is a sectional view similar to FIG. 10 depicting the fluid level in the tank rising with the cam allowing the valve stem and valve member to drop downwardly toward a blocking position between the flow paths and port.
FIG. 12 is a sectional view similar to FIG. 10 depicting the tank as having reached its maximum fill level of fluid therein with the cam allowing the valve stem to fall so that the valve member is now in its blocking position between the flow paths and port preventing further fluid flow into the tank interior.

As shown in FIGS. 1 and 2, the service valve 16 is normally provided at the top of the tank 12 with the lower portion 58 thereof extending generally vertically into the tank interior 14 such that with the valve assembly 10 attached thereto by threaded connection 18, the valve assembly 10 will also extend generally vertically along the length of the attached mounting member 46 and housing member 34. The valve assembly interior space 24 defines a fluid passageway generally following arrows 60 depicting the flow of fluid therethrough as shown in FIGS. 10 and 11 (incoming flow), and FIGS. 13 and 14 (outgoing flow).

As previously discussed, during filling operations, the incoming fluid flows through fluid passageway interior space 24 and is directed by the diverter member 36 around valve member 20 contained therein. More specifically, the diverter member 36 has a chamber which defines the interior space portion 28 in which the valve member 20 is contained until the fluid level in the tank interior 14 reaches the maximum fill level, as previously described. The diverter member 36 has an annular wall 62 which includes an interior cylindrical guiding surface 64 in which the disk-shaped valve member 20 is guided for sliding movement thereagainst. The diverter member wall 62 is closed at its top end by top wall 66 and is open at its bottom end to allow a valve stem 58 to project downwardly out from the diverter member 36 and through the bottom port 32 of the housing member 34.

The diverter member outer surface 44 extends down from the periphery of the top wall 66 in a cylindrical manner and tapers inwardly at the bottom portion 70 thereof. The housing interior surface 42 also extends down from the top thereof in a cylindrical fashion to a tapered lower portion 72 such that with the housing member 34 having the diverter member 36 press fit therein, the respective surfaces 42 and 44 will be in tight-fitting mating engagement with each other with the tapered surface portion 72 of the housing member 34 extending downwardly beyond the open end at the bottom of the tapered portion 70 of the diverter member 36 to form an inclined valve seat 74 around the port 32 at the bottom of the housing member 34.

The exterior of the housing member 34 has a generally cylindrical configuration to form the housing member cylindrical upper portion 38 in which the diverter member 34 is attached. The housing member lower guide portion 40 depends from the bottom of the housing cylindrical portion 38 and can have a generally flat bottom, U-shaped configuration with spaced vertical legs 78 and 80 interconnected by horizontal base 82 having a central guide orifice 84 by extending vertically therethrough.

The valve stem 58 has a length sufficient so that it projects through the port 30 down between the legs 78 and 80 and through the guide orifice 84 for being engaged by float assembly 30, and specifically cam member 86 thereof. Depending from the bottom of the base 82 aligned with leg 78 are a pair of spaced tabs 88 and 90 having respective mounting apertures 88a and 90a formed therein. The tabs 88 and 90 are spaced for receiving the cam member 86 therebetween and pivotally mounted thereto by pivot pin 92 inserted in the tab apertures 88a and 90a and through aligned mounting aperture 94 formed through the width of the cam member 86. With the cam member 86 pivotally attached to the valve housing 22, cam surface 96 will engage the bottom end 68a of the valve stem 68 so that pivoting of the cam member 86 controls the shifting of the valve member 20.

For pivoting the cam member 86, the float assembly 30 includes a float arm 98 that is attached at one end to the cam member 96 and at its other end to a float member 100. The float member 100 is formed of a material that will float on the pressurized liquid gas in the tank interior 14. One such material that has been found suitable for the float member 100 is a closed-cell polyurethane material. The float assembly 30, and specifically the float member 100 thereof, will rise with the liquid level during tank filling operations and will fall with the tank liquid level during tank unloading operations. The cam member 86 is pivoted by the rising and falling float member 100 causing the cam surface 96 to change its orientation with respect to the bottom end 68a of the valve stem for controlling shifting of the valve member 20 thereby. The valve stem 68, cam member 86, and float arm 98 are formed or coated with a non-corrosive material for withstanding exposure to the liquified gas contained in the tank interior 14. In this regard, a brass metal material has been found to be suitable for this purpose.

As previously discussed, peripheral flow paths 26 are provided in the housing interior space 24 so that incoming fluid can flow around the valve member 20 contained in the diverter member chamber 28 and out from port 30 into the tank interior 14 during filling operations. To form the flow paths 26 between the housing interior surface 42 and diverter member exterior surface 44, recessed channels 102 are formed in the diverter member exterior surface 44 so as to extend axially therealong. As shown, in FIGS. 5, 8, and 9, four such channels 102 define the flow paths 26 and are provided equally spaced around the periphery of the diverter member 34 at 90° increments. The channels 102 include a top beveled end 104 to provide for a smooth flow transition with flow coming down through the cylindrical portion 50 of the mounting member 46 and outwardly along flared conical wall 50a of bottom flared portion 50 and into the flow paths 26, as can be seen in FIGS. 5–7. When the flow is reversed and fluid is being unloaded from the tank interior 14, the beveled top end 104 directs flow out from the channels 102 and in a direction along the wall 50*a* up and out through the mounting member cylindrical portion 50.

Each of the channels 102 includes a beveled bottom end 106 (FIGS. 6, 7, and 9) extending inwardly and downwardly from the main recessed vertical surface 102*a* of the channels, and which terminates short of the bottom end of the exterior surface 44 so as to provide each of the recessed channels 102 with a flow opening 108 which directs incoming fluid flow out from the channels 102 and along the tapered lower portion 72 and out through port 30 into the tank interior 14 and which receives outgoing flow from the tank interior 14 therethrough and into the channels 102 for being directed out through the service valve 16. Between flow openings 108, depending tapered fingers 109 are formed at the bottom of the diverter member wall 62 extending past the ends of the channels 102.

Reference will be had next to FIGS. 10–14 to describe filling and unloading operations of the tank 12 utilizing the valve assembly 10 herein. Initially, it will be noted that a biasing member in the form of small coil spring 110 can be provided between the interior surface of the diverter member top wall 66 and the top surface of the valve member 20 for exerting a small biasing force in a downward direction toward the valve seat 74. In this manner, the valve member 20 is urged to its blocking position between the flow paths 26 and port 30.

As shown in FIG. 10, when the tank 12 is empty or has a very low fluid level, the cam surface 96 will be raised relative to the valve housing 22 which exerts an upward force on the valve stem 68 pushing the valve member 20 up into the chamber 28 against the spring bias provided by coil spring 110. In this manner, the valve member 20 is hidden or removed from the flow of fluid through the housing passageway, and specifically allows for incoming flow from flow paths 26 through the flow openings 108 and out through the port 30 into the tank interior 14.

FIG. 11 shows the float assembly 30 starting to rise up as the tank fluid level starts to rise with the cam member 86 pivoted in a clockwise direction so that the cam surface 96 is lowered with respect to the valve housing 22 which allows the valve member 20 to drop down in the chamber 28 under the influence of gravity and the small biasing force provided by spring 110. At the maximum fill level, the float assembly 30 has ascended beyond the position depicted in FIG. 11 so that the cam member 86 is pivoted slightly further in the clockwise direction to lower the cam surface 96 thereof relative to the valve housing 22 sufficiently so that the valve member 20 is in engagement with valve seat 74 in its blocking position between the flow paths 26 and the port 32. As the float assembly 30 rises during filling operations between the positions depicted in FIG. 11 and FIG. 12, the valve member 20 starts to project beyond the bottom of the diverter member inner surface 64 and into the area of the flow openings 108 with the valve member 20 being guided by diverter member fingers 109. Continued filling and rising of the float assembly 30 causes the valve member 20 to continue to move downward to progressively restrict and meter off flow through flow openings 108. As the valve member 20 is lowered into the area of the flow openings 108, the valve member 20 becomes entrained in the flow of fluid coming therethrough so that the fluid flow helps shift the valve member 20 down onto the seat 74 in its blocking position thereon. Thus, the valve member 30 is removed from the fluid flow during the majority of the tank filling operation, and then moves into the flow of fluid when the tank 12 nears its maximum fill level so as to assist in the downward shifting of the valve member 20 into sealing engagement on the seat 74 for cutting off further fluid flow into the tank interior 14.

Figures 13, 14:
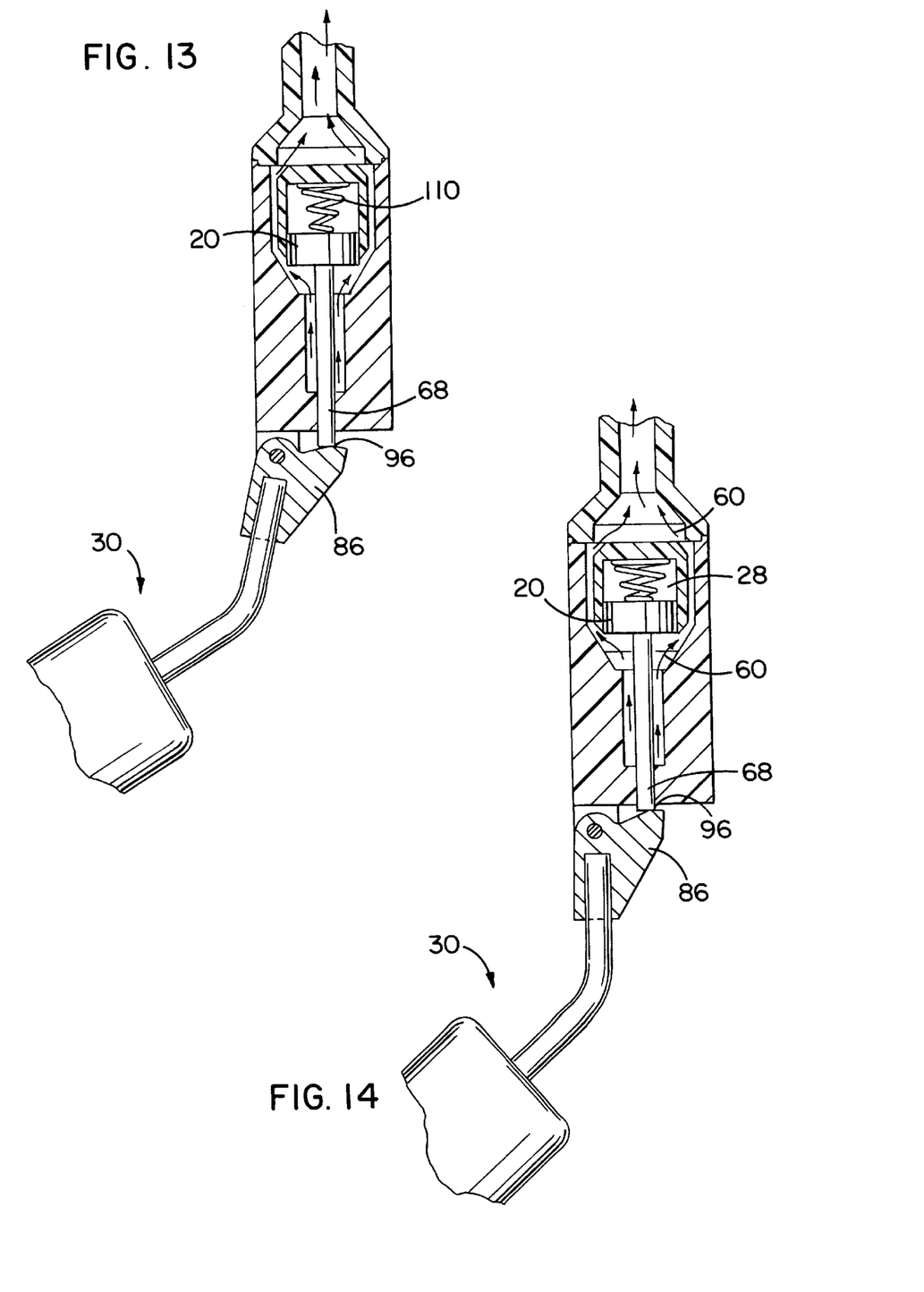
FIG. 13 is a sectional view similar to FIG. 10 showing a tank unloading operation with the fluid level in the tank receding and the cam pivoted to support the valve stem to hold the valve member in the diverter member removed from the blocking position.
FIG. 14 is a sectional view similar to FIG. 10 showing the tank almost fully unloaded.

To unload the tank 14, opening the service valve 16 to the ambient such as into a cooking grill line, allows the valve member 20 to be shifted slightly upward against the small spring force provided by spring 110 due to the pressure differential existing between the tank interior 14 and ambient pressures external thereof. The slight upward shifting of the valve member 20 creates a situation where the flow openings 108 leading to flow paths 26 are no longer completed blocked by valve member 20 so that fluid flows through the openings 102 into flow path channels 106 and up past the diverter member 34 to start to unload the tank 12 through the valve assembly 10 and service valve 16. As fluid continues to be unloaded from the tank interior 14, the float assembly 30 lowers pivoting the cam member 86 in a counterclockwise direction which raises the cam surface 96 thereof relative to the valve housing 22. This pushes the valve stem 68 vertically upward so that the valve member 20 clears the flow opening areas 108 for providing unimpeded flow into the flow paths 26 and out from the valve assembly 10 and service valve 16.

Based on the foregoing, it will be apparent that it is important for the valve member 20 to properly drop down and tightly engage the valve seat 74 when the liquid level reaches the maximum fill condition in the tank interior 14, as depicted in FIG. 12. In this regard, while it is also important to provide a good flow rate through the valve assembly 10 during filling operations into the tank interior 14, any excessive turbulence that develops in the fluid flow through the valve assembly 10 is to be avoided as that can negatively impact on the ability of the valve member 20 to move to its blocking position. Accordingly, the size of the recessed channels 102 is carefully controlled so that a sufficient flow rate is obtained into the tank interior 14 during filling operations while also allowing the valve member 20, preferably with a spring assist by spring 110, to drop onto the valve seat 74 at the predetermined maximum fill level. By way of example, the recessed channels 102 can be provided with a depth of 0.040 inch, and an axial length along the main vertical surface 102*a* of approximately 0.347 inch. The angle of the beveled top end 104 is preferably approximately 45° with the top end 104 spanning a vertical distance of 0.040 inch. The vertical distance of the diverter member tapered bottom portion 70 is approximately 0.156 inch to provide an axial length for the diverter member wall 62 of approximately 0.578 inch.

It has been found with the diverter member 34 and particularly the recessed channels 102 thereof having the above dimensions, an adequately high flow rate into the LP tank 12 can be achieved. In addition, the flow rate is controlled so that a relatively small spring force can be provided to overcome any turbulence that may be generated in the recessed channels 102, and specifically at the flow openings 108 thereof. In this regard, the spring force must be minimized so that the lever arm provided by the float assembly 30 can push the valve member 20 up into the diverter member 36 against the spring force during filling operations. With relatively small 12-inch diameter LP tanks and the service valve 16 and the attached valve assembly 10 being centrally mounted at the top of the tank 12, the length of the lever arm measured linearly between the pivot pin 94 and the distal end of the float member 100 is preferably between approximately 5 and 5½ inches in length. With such a small lever arm as afforded by the float assembly 30 herein due to the small LP tank diameter, the force exerted by the spring 110 on the top side of the valve member 20 cannot be so large that it would prevent the valve member 20 from being lifted from its blocking position on valve seat 74 during tank unloading operations. In this regard, a coil spring that exerts a force of approximately two grams when slightly compressed between the diverter member top wall 66 and valve member 20 has been found to be suitable to properly seat valve member 20 in its blocking position while allowing the float assembly 30 to pivot the cam member 86 lifting the valve stem 68 to shift the valve member 20 upwardly and into the diverter member chamber 28 during tank unloading operations.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A valve assembly for permitting fluid intake into an interior space in a vessel filling operation and fluid discharge therefrom in a vessel unloading operation and for cutting off fluid intake into the vessel at a predetermined fluid level in the vessel space during filling operations, the valve assembly comprising:

a fixed housing of the valve assembly;

a fluid flow path through the housing for allowing flow through the valve into and out from the vessels so that both vessel filling and unloading operations occur via fluid flow through the valve assembly;

a port of the housing for communicating with the vessel interior;

a valve member for shifting in the housing as the fluid level changes in the vessel interior space and in response to the pressure differential between the vessel space and ambient; and a float assembly for rising and falling in substantial correspondence to the rising and falling of the fluid level in the vessel space with the float assembly controlling shifting of the valve member to keep it removed from the flow of fluid between the flow path and the port at fluid levels below a predetermined maximum fill level in the vessel during filling and unloading operations, and during filling operations to allow it to shift into a flow blocking position between the flow path and the port at the predetermined maximum fill level for preventing further fluid flow through the flow path out from the port and into the vessel interior with the pressure differential between the vessel interior and ambient being sufficient to cause the valve member to shift away from the blocking position independent of the float assembly to begin vessel unloading operations from the filled vessel with the float assembly falling to continue shifting of the valve member away from blocking position.

2. The valve assembly of claim 1 wherein the valve housing includes a seat at the port and the valve member shifts onto the seat in the blocking position at the predetermined maximum fill level with the incoming fluid flow during filling operations assisting in tightly pushing the valve member onto the seat to prevent flow through the port and into the vessel interior.

3. The valve assembly of claim 1 wherein the valve housing includes a fixed inner member in which the valve member shifts and an outer member rigidly attached to the inner member with the flow path defined between the housing inner and outer members.

4. The valve assembly of claim 3 wherein the flow paths comprise a plurality of discrete flow paths around the housing inner member for directing incoming fluid around the valve member in the inner member and each of the flow paths communicating with the port of the housing for directing incoming fluid through the port during vessel filling operations and for receiving outgoing fluid therethrough from the vessel interior during vessel unloading operations.

5. The valve assembly of claim 1 wherein the flow path has a flow opening that directs fluid flow from the flow path during a filling operation to impinge against the valve member for assisting in shifting the valve member to the blocking position when the fluid reaches the predetermined fill level in the vessel interior.

6. The valve assembly of claim 1 wherein the flow path has a predetermined size for permitting a predetermined flow rate of fluid therethrough during filling operations to limit fluid turbulence that would keep the valve member from shifting to the blocking position at the predetermined fill level.

7. The valve assembly of claim 6 wherein the float assembly includes a pivotable arm and attached float of predetermined length for fitting in the vessel with the float being attached to one end of the arm which pivots the arm as the float rises and falls with the fluid level, and a cam attached to the other end of the arm for being pivoted thereby, and the valve member includes a stem extending beyond the valve housing into engagement with the cam for keeping the valve member removed from the flow of fluid until the fluid in the vessel interior reaches the predetermined fill level, and a biasing member which urges the valve member toward the blocking position with a predetermined force for overcoming turbulence created during filling operations with said predetermined force being sufficiently low to allow the arm to pivot the cam at fluid levels in the vessel interior below the predetermined fill level so that the valve member is not in its blocking position.

8. The valve assembly of claim 1 wherein the float assembly includes a cam which pivots as the float assembly rises and falls with the vessel fluid level, and the valve member includes a stem attached thereto and extending into engagement with the cam during both filling and unloading operations so that the cam is operable to shift the valve member in response to both rising and falling fluid levels in the vessel.

9. The valve assembly of claim 1 in combination with a vessel for containing liquified gas under pressure as supplied by a pressurized source of the liquified gas, and including a biasing member for urging the valve member toward the blocking position with a predetermined force selected to allow the valve member to shift from the blocking position when the vessel is opened to ambient for discharging fluid in vessel unloading operations.

10. A valve assembly for being connected to a service valve attached to a tank for holding liquified gas fluid in its interior at pressures greater than ambient exterior of the tank to produce a pressure differential therebetween with the liquified gas being loaded into and unloaded out from the tank interior with the service valve opened and through the valve assembly, the valve assembly comprising:

a body of the valve assembly affixed to the service valve;

an interior space of the body to provide a fluid passageway through the body between the service valve and the tank interior for loading and unloading of fluid into and out from the tank;

a single valve member that shifts in a portion of the body interior space in response to changing fluid levels in the tank interior;

peripheral flow paths formed in the body for redirecting fluid flow through the body interior space during fluid loading operations around the portion of the space containing the valve member;

a float assembly that rises and falls with the fluid level in the tank interior for shifting the valve member in the body interior space portion; and a port of the body adjacent the flow paths with fluid flowing through the flow paths and into the port during vessel loading operations and flowing through the port and into the flow paths during vessel unloading operations, the float assembly being operable to allow the valve member to shift in a first direction to a blocking position between the flow paths and port during tank loading operations when the fluid level therein reaches the predetermined maximum fill level to stop further loading of fluid into the tank interior with the pressure differential between the tank and ambient being sufficient to cause the valve member to shift in a second direction opposite to the first direction away from the blocking position when the service valve is opened to the ambient with the tank at the predetermined maximum fill level for allowing fluid from the tank interior to flow through the fluid passageway and into and out from the service valve.

11. The valve assembly of claim 10 wherein the body includes an outer cylindrical portion and an inner diverter member rigidly secured in the cylindrical portion with the diverter member defining the portion of the body interior space in which the valve member is disposed, the diverter member including opposite ends with one end being closed and the other end being open and facing the port, and the flow paths are formed between the diverter member and the cylindrical portion with the valve member blocking position being generally at the diverter member open end so that at least a portion of the valve member projects therefrom into the blocking position between the flow paths and the port.

12. The valve assembly of claim 10 wherein the valve assembly body is affixed to the service valve to extend generally vertically in the interior of the tank and the fluid passageway of the body has an upper section and a lower section below the upper section and at the bottom of which the port is disposed with the portion of the body interior space containing the valve member being between the fluid passageway sections so that when the tank fluid level reaches the predetermined maximum fill level during tank loading the valve member falls in the body interior space portion toward the port and into the flow of fluid which assists in shifting the valve member to its blocking position for sealing the port and preventing further fluid loading into the tank interior.

13. The valve assembly of claim 10 wherein the float assembly includes a cam that is pivoted as the tank fluid level changes, and including a valve stem connected to the valve member at one end thereof and engaged with the cam at the other end thereof with the float assembly including the cam thereof operable to support the valve stem at fluid levels below a predetermined maximum fill level during both fluid loading and unloading operations to keep the valve member in the portion of the body interior space removed from the flow paths.

* * * * *

UNITED STATES PATENT AND TRADEMARK OFFICE
CERTIFICATE OF CORRECTION

PATENT NO. : 6,076,546
DATED : June 20, 2000
INVENTOR(S) : Waters

It is certified that error appears in the above-identified patent and that said Letters Patent is hereby corrected as shown below:

In column 11, line 33, please delete "as the" and insert --in response to--.

In column 11, lines 39-40, please delete "controlling shifting of" and insert --allowing--.

In column 11, line 40, please delete "keep it" and insert --shift for being--.

In column 11, lines 54-55, please delete "continue shifting of the valve member away from blocking position" and insert --during continued vessel unloading until the vessel is completely unloaded where the float assembly cooperates to keep the valve member shifted away from the blocking position--.

In column 13, line 30, after the word "valve" please insert --to begin unloading with the float assembly allowing the valve member to stay shifted away from the blocking position for continued vessel unloading.--

UNITED STATES PATENT AND TRADEMARK OFFICE
CERTIFICATE OF CORRECTION

PATENT NO. : 6,076,546
DATED : June 20, 2000
INVENTOR(S) : Waters

It is certified that error appears in the above-identified patent and that said Letters Patent is hereby corrected as shown below:

In column 12, line 59, please delete "produce" and insert --provide--.

Signed and Sealed this

Twenty-fourth Day of April, 2001

Attest:

NICHOLAS P. GODICI

Attesting Officer

Acting Director of the United States Patent and Trademark Office